United States Patent [19]

Baldauf

[11] Patent Number: 5,258,913
[45] Date of Patent: Nov. 2, 1993

[54] METHOD AND APPARATUS FOR LEVELING A BODY

[75] Inventor: Karl-Eberhard Baldauf, Saarbrücken, Fed. Rep. of Germany

[73] Assignee: Hydac Technology GmbH, Sulzbach/Saar, Fed. Rep. of Germany

[21] Appl. No.: 775,575

[22] Filed: Oct. 15, 1991

[30] Foreign Application Priority Data

Oct. 24, 1990 [DE] Fed. Rep. of Germany ....... 4033761

[51] Int. Cl.$^5$ ................................................ B60S 9/00
[52] U.S. Cl. .................................. 364/424.05; 280/6.1; 280/840
[58] Field of Search .................. 364/424.05; 280/707, 280/840, 6.1, 6.11, 6.12

[56] References Cited

U.S. PATENT DOCUMENTS

| | | | |
|---|---|---|---|
| 4,597,584 | 7/1986 | Hanser | 280/6.1 |
| 4,709,934 | 12/1987 | Suzuki et al. | 280/840 |
| 4,784,400 | 11/1988 | Hofius | 280/6.1 |
| 4,829,436 | 5/1989 | Kowalik et al. | 280/840 |
| 4,913,458 | 4/1990 | Hamilton | 280/6.1 |
| 5,097,419 | 3/1992 | Lizell | 280/840 |
| 5,162,995 | 10/1992 | Ikemoto et al. | 280/840 |
| 5,176,391 | 1/1993 | Schneider et al. | 280/6.12 |

FOREIGN PATENT DOCUMENTS

| | | |
|---|---|---|
| 3143713 | 5/1983 | Fed. Rep. of Germany . |
| 3145975 | 6/1983 | Fed. Rep. of Germany . |
| 3300662 | 7/1984 | Fed. Rep. of Germany . |
| 3512232 | 8/1986 | Fed. Rep. of Germany . |
| 3619777 | 12/1987 | Fed. Rep. of Germany . |

*Primary Examiner*—Gary Chin
*Attorney, Agent, or Firm*—Roylance, Abrams, Berdo & Goodman

[57] ABSTRACT

Hydraulic supporting cylinders are extended for levelling a body, for example, a platform or vehicle part. As soon as one of the cylinders reaches a supporting position while moving out, further extension of this cylinder is temporarily discontinued. After extension of the last supporting cylinder, i.e., that cylinder which is the last to reach the supporting position, has been discontinued, the levelling operation is completed by only operating the other supporting cylinders which had previously reached the supporting position. The other supporting cylinders are further extended until the level position is reached.

11 Claims, 1 Drawing Sheet

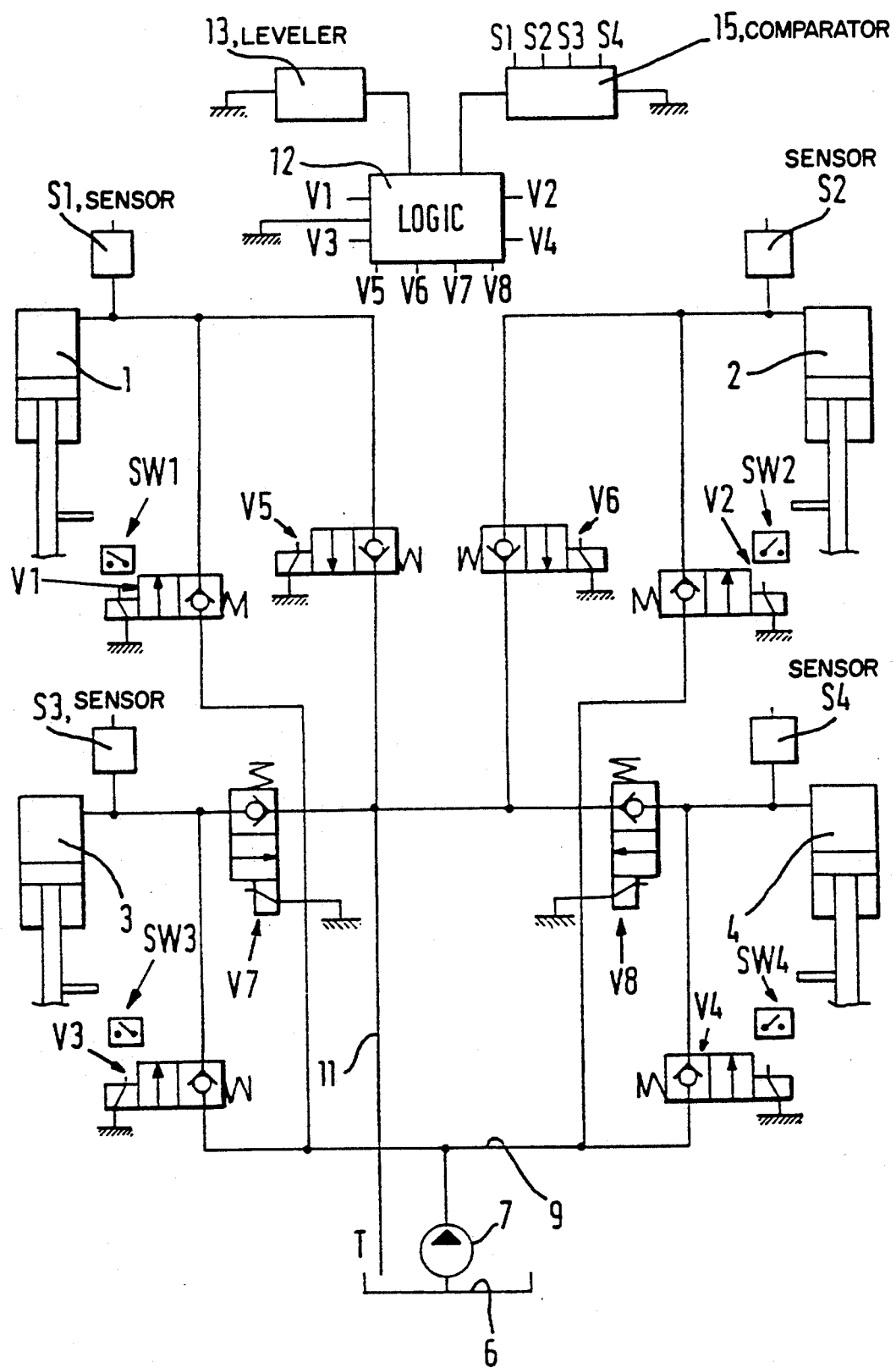

METHOD AND APPARATUS FOR LEVELING A BODY

FIELD OF THE INVENTION

The present invention relates to a method and apparatus for carrying out a levelling operation on a body, in particular, a vehicle part, on a base area by at least three hydraulic supporting cylinders spaced from one another on the body to be levelled. Position signals are generated by a levelling device as a function of deviations in the position of the body relative to the level position. The position signals are processed by a control logic to generate valve control signals which are used to activate control valves for selectively supplying the supporting cylinders with proportioned quantities of pressure fluid.

BACKGROUND OF THE INVENTION

For automatic performance of levelling operations on bodies supported by three or more supporting cylinders, for example, chassis parts or bodies of vehicles, platforms as beds for cranes, equipment or the like, the use of elaborate technical means has been required. For example, such levelling method can be carried out using the main components of known level regulating devices for motor vehicles which have to be provided with supplementary devices for the levelling. DE 36 19 777 C2 shows examples of such level regulating devices.

However, in such cases where such complex hydraulic devices are not present or cannot be readily used in a purposeful way, for example, with simply equipped platforms which are directly supported on the base area via the supporting cylinders, one has been forced to carry out the levelling operations by manual operation or manual control of the supporting cylinders.

SUMMARY OF THE INVENTION

Objects of the present invention are to provide a method and apparatus for levelling a body which can be carried out with relatively low expenditure so that it is also suitable for use in field operations where levelling operations have previously been carried out manually.

The foregoing objects are obtained by a method for levelling a body on a base area by at least three hydraulic supporting cylinders spaced from one another on the body to be levelled, comprising the steps of: generating position signals by a levelling device as a function of deviations in a position of the body relative to a level position; processing the position signals by a control logic to valve control signals; and activating control valves for selectively supplying the supporting cylinders with proportioned quantities of pressure fluid; the improvement characterized in that a) at the start of a levelling operation, generating the control signals by the control logic independently of position signals of the levelling device and transmitting such control signals to the control valves of all supporting cylinders to supply all supporting cylinders with the proportioned quantities of pressure fluid, b) determining pressure values prevailing in all supporting cylinders, c) upon sensing a rise in pressure in a first supporting cylinder exceeding a predetermined threshold value, generating a stop pressure signal by the control logic for the first supporting cylinder to discontinue supplying the first supporting cylinder with pressure fluid, and repeating this step for the remaining support cylinders, and d) after discontinuing supplying the last supporting cylinder with pressure fluid for which the stop pressure signal was last generated, completing the levelling operation using only the other supporting cylinders by supplying pressure fluid in accordance with the position signals of the levelling device to the other supporting cylinders.

In the inventive method, the procedure is such that in accordance with feature a) all of the supporting cylinders are first allowed to move out by proportioned quantities of pressure fluid being fed to the supporting cylinders. The metered feeding of the pressure fluid to the supporting cylinders can be carried out by the control valve of each cylinder being actuated in a clocked manner via an equal-stroke circuit of the conventional kind. Either the control valves of all the supporting cylinders can be clocked simultaneously or the activation can be carried out sequentially, i.e., the supporting cylinders are clocked one after the other. In the latter case, a hydraulic system with a lower pump conveying capacity can, under certain circumstances, be used.

As the vehicle part or the platform to be levelled is aligned at random to the underlying base at the start of the levelling operation, when the supporting cylinders move out, they do not simultaneously reach a supporting position in which a supporting force is built up between the base area of the underlying base and the supporting cylinder. On the contrary, this state is first reached in the case of one of the supporting cylinders only.

In accordance with features b) and c), the reaching of the supporting position is now determined in the case of each of the supporting cylinders on the basis of the corresponding rise in pressure of the pressure fluid as becomes evident from the metered supplying with pressure fluid when the supporting position is reached. Once this state is reached in the case of one cylinder, a pressure signal is generated to interrupt further supplying of the respective cylinder with pressure fluid. The prevailing pressure in the working chambers of the supporting cylinders can be determined simultaneously, continuously and/or sequentially.

After the supply of pressure fluid has thus been discontinued on all supporting cylinders one after the other up to the last of those supporting cylinders provided, i.e., where four supporting cylinders are provided, the fourth or last cylinder has also been switched off. The supporting position of this fourth cylinder then serves as a level reference point from which the further levelling operation according to feature d) is completed by the rest of the other supporting cylinders. The other supporting cylinders, which had already been previously switched off, are now further actuated in accordance with the position signals of a conventional levelling device until the level position is reached. The levelling device can be an electronic bubble tube of a known type.

The method can be carried out by that supporting cylinder on which the supply of pressure fluid is last cut off, i.e., the supporting cylinder which defines the reference point for completion of the levelling operation, being still further extended in one or several clockings of the equal-stroke circuit before the levelling is completed, by position-dependent actuation of the remaining supporting cylinders. This ensures that the vehicle part or platform to be levelled will get away safely from the supporting base area in all regions of its dimensional range after completion of the levelling operation.

Furthermore, when a supporting cylinder is fully extended, provision may be made for an end position signal indicating the end of the length of its stroke. The end position signal is generated so that the further levelling operation is stopped. The arrangement is preferably designed so that an end position signal also indicates which of the supporting cylinders has been fully extended. This supporting cylinder is then, preferably automatically, retracted again to give the operator who is told by a light or sound signal which of the cylinders it is, the opportunity of placing an insert (block or reinforced support) between the cylinder and the supporting point on the base area. The levelling operation can be then fully completed or started again.

The inventive method is equally employable when it is a body which is directly supported on the base area via the supporting cylinders, for example, a platform, or when it is a vehicle part which is supported relative to the base area via the hydraulic level regulating device or has a mechanical suspension in classic form relative to the underlying base. In the two last mentioned cases, the levelling is carried out via supporting cylinders integrated in the level regulating device and by cooperation between supporting cylinders and components of the mechanical suspension system, respectively.

An apparatus for carrying out the levelling method comprises at least three hydraulic supporting cylinders spaced from one another on the body to be levelled. The body can be supported on a base area via these supporting cylinders. The supporting cylinders can be selectively supplied with proportioned quantities of pressure fluid via control valves which can be actuated by valve control signals made available by a control logic. A pressure sensor is associated with each supporting cylinder for determining the pressure of the pressure fluid in the supporting cylinder and for generating a pressure value signal which represents the quantity of this pressure. The pressure value signal can be transmitted to the control logic for signal processing. On the basis of the pressure value signals provided by the pressure sensors, the reaching of the supporting position by the individual supporting cylinders can be determined by the control logic so that the initial supplying of the supporting cylinders with pressure fluid at the beginning of a levelling operation is discontinued upon the individual cylinders one after the other reaching a supporting position. The last supporting cylinder reaching a supporting position then defines the reference point for completion of the levelling operation.

Other objects, advantages and salient features of the present invention will become apparent from the following detailed description, which, taken in conjunction with the annexed drawings, discloses preferred embodiments of the present invention.

BRIEF DESCRIPTION OF THE DRAWING

The single drawing figure graphically illustrates a circuit diagram of an embodiment of the apparatus for performing the levelling method according to the present invention. The circuit diagram is schematically simplified and essentially limited to the hydraulic part.

DETAILED DESCRIPTION OF THE INVENTION

A body, not illustrated in the drawing, which is supported on a base area of an underlying base and which is to be brought into a level position comprises in the given example four hydraulic supporting cylinders 1, 2, 3, and 4 spaced from one another. More specifically, each cylinder is in a corner region of the body which is essentially rectangular in outline. The body to be levelled may be a platform serving, for example, as crane girder or equipment carrier or it may be a vehicle part, for example, the body or the frame of a heavy road vehicle. In the case of a platform, the supporting cylinders 1 to 4 serve as direct support in cooperation with the base area of the underlying base. In the case of a vehicle part, the supporting cylinders 1 to 4 may be components of the suspension system, for example, cooperating with parts of a mechanical suspension system. Alternatively, they may constitute part of a hydraulic level regulating device designed, for example, in the way known from DE 36 19 777 C2.

To supply the supporting cylinders 1 to 4 with pressure oil from a tank 6, a hydraulic pump 7 is provided. The pressure side of pump 7 is connected to a pressure line 9. Pressure oil can be fed from the pressure line 9 to the working chamber of each of the supporting cylinders 1 to 4 via its associated control valve designated $V_1$, $V_2$, $V_3$ and $V_4$, respectively, in the Figure. The valves $V_1$ to $V_4$ are all identical directional seat valves equipped with an electromagnetic drive.

The working chamber of each of the supporting cylinders 1 to 4 is also connected via a further control valve designated $V_5$ in the case of supporting cylinder 1, $V_6$ in the case of supporting cylinder 2, $V_7$ in the case of supporting cylinder 3 and $V_8$ in the case of supporting cylinder 4 to a return line 11 leading to a tank 6. Like valves $V_1$ to $V_4$, valves $V_5$ to $V_8$ are directional seat valves with electromagnetic drives.

Each of the supporting cylinders 1 to 4 has an associated pressure sensor $S_1$, $S_2$, $S_3$ and $S_4$, respectively, arranged with the line segment between the respective supporting cylinder and its associated control valves to detect the pressure prevailing in the working chamber of the cylinder.

For controlling the valves $V_1$ to $V_8$, their drives are connected via control lines, not illustrated, to associated outputs of a control logic 12. The control logic 12 receives, from a levelling device 13, position signals which represent the deviation in the position of the body to be levelled from the desired level position. The levelling device 13, for example, in the form of an electronic bubble tube, of the conventional kind, generates the position signals in the usual way with the aid of inclination sensors which are connected to the body to be levelled.

The control logic 12 is also connected to the output of a comparator circuit 15. The comparator circuit 15 receives via control lines, not illustrated, the pressure value signals generated by the pressure sensors $S_1$ to $S_4$, the signal value of which corresponds to the size of the pressure prevailing in the working chamber of the associated supporting cylinder 1 to 4. The comparator circuit 15 compares the signal value of the pressure value signals with a predetermined threshold value and then transmits a stop pressure signal to the control logic 12 if the signal provided by the pressure sensors $S_1$ to $S_4$ exceeds the threshold value, i.e., if the internal pressure prevailing in a supporting cylinder 1 to 4 exceeds a certain pressure value.

The threshold value is selected to correspond to a rise in pressure in the working chamber of the supporting cylinders 1 to 4, as occurs, when during the moving-out of the respective supporting cylinder, a supporting position is reached at which a corresponding supporting force is built up between the base area of the underlying base and the supporting cylinder. With a platform resting in a random position on the underlying base, this is the case when one of the supporting cylinders 1 to 4 comes into contact with the base area of the underlying base while it moves out. With a vehicle part supported via a suspended chassis, this the case when the respective supporting cylinder builds up a corresponding axle or wheel load while it moves out.

At the beginning of a levelling operation, the control valves $V_1$ to $V_4$ connected to the pressure line 9 are first operated intermittently by the control logic 12 comprising an equal-stroke clocking circuit such that the supporting cylinders 1 to 4 move out intermittently in equal strokes in a clocked or timed manner. As the platform or the vehicle part to be levelled first assumes a random position relative to the base area, initially only a first one of the supporting cylinders 1 to 4 will reach the supporting position. When this is the case and the corresponding pressure rise occurs in the said first cylinder, a pressure signal relating to this is generated by the respective pressure sensor $S_1$ to $S_4$ and the comparator circuit 15 and is transmitted to the control logic 12. This causes the control valve $V_1$, $V_2$, $V_3$ or $V_4$ of said first supporting cylinder to no longer be clocked, i.e., to be switched off so that the respective cylinder is not supplied with pressure oil. The remaining supporting cylinders are clocked further until the next cylinder reaches the supporting position and is, consequently, likewise switched off. After the last of the supporting cylinders 1 to 4 is switched off, the levelling operation is completed by merely the other supporting cylinders, which had already been previously switched off, being further supplied in a clocked manner with hydraulic oil, more specifically, in accordance with the position signals transmitted by the levelling device 13 to the control logic 12, until there is no longer any deviation in the position from the level position.

Assuming that supporting cylinder 2 is the last cylinder whose supply is interrupted during the initial moving-out, then for completion of the levelling operation, controlled in accordance with the position signals of the levelling device 13, only supporting cylinders 1, 3 and 4 are still clocked. The supporting cylinder 2 remains switched off, i.e., defines the reference point for completion of the levelling operation. In many cases it is advantageous to allow the supporting cylinder which is switched off last, i.e., in the assumed case supporting cylinder 2, to move out an additional distance before completion of the levelling operation so as to ensure that there will be adequate spacing of the body from the base area after completion of the levelling operation.

A precondition of the method described herein is that all of the supporting cylinders provided be freely extendable in the level position of the body, i.e., the pistons have adequate spacing from the respective end positions. This is taken into account in the embodiment described herein by there being associated with each supporting cylinder 1 to 4, an end position switch SW 1, SW 2, SW 3 and SW 4, respectively, which generates an end position signal when the cylinder is fully extended. The control logic 12, furthermore, causes the respective, fully extended supporting cylinder 1 to 4 to retract by removal of hydraulic oil. The retraction of the supporting cylinders 1 to 4 is carried out by controlling the control valves $V_5$, $V_6$, $V_7$ and $V_8$, connected to the return line 11. The operator can then take suitable remedial measures prior to re-initiation of the levelling operation by, for example, positioning suitable supports on the base area in the region of the indicated supporting cylinder.

While various embodiments have been chosen to illustrate the invention, it will be understood by those skilled in the art that various changes and modifications can be made therein without departing from the scope of the invention as defined in the appended claims.

What is claimed is:

1. In a method for levelling a body on a base area by at least three hydraulic supporting cylinders spaced from one another on the body to be levelled, including the steps of:
   generating position signals by a levelling device representative of deviations in a position of the body relative to a level position;
   converting the position signals in a control logic to valve control signals; and
   activating control valves using the valve control signals for selectively supplying the supporting cylinders with proportioned quantities of pressure fluid;
   the improvement comprising
   a) at the start of a levelling operating, generating the valve control signals by the control logic independently of the position signals of the levelling device and transmitting the independent control signals to the control valves of all the supporting cylinders to supply all the supporting cylinders with the proportioned quantities of pressure fluid,
   b) determining pressure values prevailing in all the supporting cylinders,
   c) upon sensing a rise in pressure in a first one of the supporting cylinders exceeding a predetermined threshold value, generating a stop pressure signal by the control logic for the first one of the supporting cylinders to discontinue supplying the first one of the supporting cylinders with pressure fluid, and repeating this step for the remaining ones of the supporting cylinders, and
   d) after discontinuing supplying a last one of the supporting cylinders with pressure fluid for which the stop pressure signal was last generated, completing the levelling operation using only the others of the supporting cylinders by supplying pressure fluid in accordance with the position signals of the levelling device to the others of the supporting cylinders.

2. A method according to claim 1 wherein the pressure values prevailing in all of the supporting cylinders are determined dependent upon supplying of the supporting cylinders with the proportioned quantities of pressure fluid, in a timed manner.

3. A method according to claim 1 wherein, after discontinuing supplying of the last one of the supporting cylinders with pressure fluid for which the stop pressure signal was last generated, supplying an additional, proportioned quantity of pressure fluid to the last one of the supporting cylinders before the levelling operation is completed by supplying the other ones of the supporting cylinders with pressure fluid in accordance with the position signals.

4. A method according to claim 1 wherein, when one of the supporting cylinders is fully extended, generating an end position signal indicating an end of a length of a stroke thereof for the respective supporting cylinder, and then discontinuing the levelling operation by the control logic in response to generation of the end position signal.

5. A method according to claim 4 wherein an indicating signal designating a fully extended supporting cylinder is generated in response to the end position signal, whereupon the control logic generates a valve control signal causing removal of pressure fluid from the respective supporting cylinder for retraction of the fully extended supporting cylinder.

6. An apparatus for levelling a body on a base area, comprising:
   at least three hydraulic supporting cylinders spaced from one another on said body to be levelled, said body being supportable on said base area by said supporting cylinders;
   means for selectively supplying said supporting cylinders with proportioned quantities of pressure fluid via control valves actuated by valve control signal;
   a pressure sensor means associated with each said supporting cylinder for determining the pressure of pressure fluid in the respective supporting cylinder and for generating pressure value signals representative of the pressure;
   levelling means, coupled to said body, for generating position signals representative of deviations in a position of said body relative to a level position; and
   control logic means, coupled to said control valves, said levelling means and said pressure sensor means, for receiving said position signals and said pressure value signals, and for
   a) at the start of a levelling operation, generating said valve control signals independently of said position signals and transmitting said independent control signals to said control valves of all said supporting cylinders to supply of all said supporting cylinders with said proportioned quantities of pressure fluid,
   b) upon sensing a rise in pressure in a first one of said supporting cylinders exceeding a predetermined threshold value, generating a stop pressure signal and transmitting said stop pressure signal to said first of one said supporting cylinders to discontinue supplying said first one of said supporting cylinders with pressure fluid, and for generating and transmitting said stop pressure signal for the remaining ones of said supporting cylinders, and
   c) after discontinuing supplying a last one of said supporting cylinders with pressure fluid for which said stop pressure signal was last generated, completing levelling using only the others of said supporting cylinders by supplying pressure fluid in accordance with said position signals to the others of said supporting cylinders.

7. An apparatus according to claim 6 wherein said control logic means comprises a comparator circuit for processing said pressure value signals of said pressure sensor means, and for, upon one of said pressure value signals exceeding a threshold value, generating a pressure signal designating a corresponding rise in pressure in the respective supporting cylinder.

8. An apparatus according to claim 6 wherein said pressure sensor means determines said pressure values prevailing in all of said supporting cylinders dependent upon supplying of said supporting cylinders with said proportioned quantities of pressure fluid.

9. A apparatus according to claim 6 wherein, after discontinuing supplying of said last one of said supporting cylinders with pressure fluid for which said stop pressure signal was last generated, said control logic means generates control valve signals to supply an additional, proportioned quantity of pressure fluid to said last one of said supporting cylinders before the levelling is completed by supplying the other ones of said supporting cylinders with pressure fluid in accordance with said position signals.

10. An apparatus according to claim 6 wherein, when one of said supporting cylinders is fully extended, said control logic means generates an end position signal indicating an end of a length of a stroke thereof for the respective supporting cylinder, and then discontinues levelling in response to generation of said end position signal.

11. A apparatus according to claim 10 wherein said control logic means generates a valve control signal causing removal of pressure fluid from the respective supporting cylinder for retraction of a fully extended one of said supporting cylinders.

* * * * *